United States Patent [19]

Matheny et al.

[11] 3,720,207

[45] March 13, 1973

[54] EMERGENCY AIR SUPPLY SYSTEM FOR PASSENGERS OF A SUBMERGED LAND VEHICLE

[76] Inventors: Alfred Paul Matheny, 616 Prosperity Farms Road, North Palm Beach; John R. Rahon, 2052 Ardley Road, Juno Isles, both of Fla. 33408

[22] Filed: Dec. 2, 1970

[21] Appl. No.: 94,483

[52] U.S. Cl. ................................128/142, 152/415
[51] Int. Cl. ..............................................A62b 7/00
[58] Field of Search........128/142, 141, 142.2, 142.3, 128/142.4, 142.5, 142.6, 145.5, 145.6, 145.7, 145.8, 1 A, 146.7; 222/399; 9/332; 152/415, 416, 418; 98/1.5

[56] References Cited

UNITED STATES PATENTS

| | | | |
|---|---|---|---|
| 2,818,858 | 1/1958 | Holm | 128/142.2 |
| 3,461,789 | 8/1969 | Texidor | 98/1.5 |
| 2,399,643 | 5/1946 | Kreiselman | 128/145.7 |
| 1,910,445 | 5/1933 | Paquelte | 222/399 |
| 3,107,373 | 10/1963 | Mellon | 128/141 R |
| 1,331,601 | 2/1920 | Watanabe | 128/142 |

Primary Examiner—Richard A. Gaudet
Assistant Examiner—G. F. Dunne
Attorney—Jack N. McCarthy

[57] ABSTRACT

An available pressurized air source, such as an inflated tire, connectable by appropriate conduit means, with flow control and pressure regulation provisions, through an air transmitter or face mask, to the breathing passages of a passenger in a submerged land vehicle to either provide emergency breathing air for the passenger, or to fill an inflatable and portable air pack which the passenger may leave the vehicle with, or both.

11 Claims, 13 Drawing Figures

EMERGENCY AIR SUPPLY SYSTEM FOR PASSENGERS OF A SUBMERGED LAND VEHICLE

BACKGROUND OF THE INVENTION

1. Field of the Invention

This invention relates to the providing of an emergency breathing air supply to a passenger in a submerged land vehicle, such as an automobile, and more particularly to such a system which will not only enable the passenger to breath while submerged in the land vehicle but will also provide a portable air supply to the passenger to use upon leaving the submerged vehicle to assist him to the surface and to assist him in floating on the surface until rescued.

2. Description of the Prior Art

There are no known mechanisms for performing this function and while mechanisms have been provided to permit a person to enter or remain in a hostile environment, none of the known mechanisms have the capability of installation in an automobile and emergency use when required.

SUMMARY OF THE INVENTION

The primary object of the present invention is to provide an emergency air supply for a passenger in a submerged land vehicle.

In accordance with the present invention, a vehicle occupant is allowed mobility while utilizing the emergency air supply, the emergency air supply is provided from an available source, such as an inflated vehicle tire, and the system is adapted to provide the vehicle occupant with a portable air supply for leaving the vehicle and proceeding to the surface of the water.

In accordance with a further aspect of this invention, flow control and pressure regulating means are provided to control the pressure of the air being provided to the entrapped vehicle passenger from an available pressurized air source at a pressure slightly in excess of the pressure of the surrounding environment to permit ease of breathing of the occupant.

In accordance with a further aspect of this invention, the air source for emergency breathing may be a vehicle spare tire and/or at least one vehicle tire mounted for operation, an impact air cushion, or a separate container provided for this purpose, or any of these in combination. If a separate container is used for the air source, that the container could be positioned under the front seat of the vehicle, could be removably attached to the roof of the vehicle or otherwise conveniently located.

In accordance with a further aspect of this invention, the emergency air supply system can be used for long periods of time due to the fact that the passenger breathed air is not lost to the system.

In accordance with still a further aspect of this present invention, pump means are provided to assist the passenger in either receiving air from the pressurized air source or returning breathed air thereto. The pump means can be either manually or automatically operated.

In accordance with a further aspect of the present invention, provision may be made for the transmitting of the emergency breathing air from the pressurized air source either directly to the car passenger through proper flow control and pressure regulating means and also to an inflatable, portable air trapper unit which may serve as the passenger's air supply upon leaving the submerged vehicle and swimming to the surface.

This invention permits a life jacket to serve as the air trapper mechanism to provide both an emergency breathing air supply to the vehicle passenger after leaving the submerged car and to assist the passenger In coming to and remaining on the surface of the water.

In accordance with another aspect, provision is made for an air transmitter, or face mask, device which provides an automatic feature of preventing loss of air prior to use by a passenger.

Figure 1:
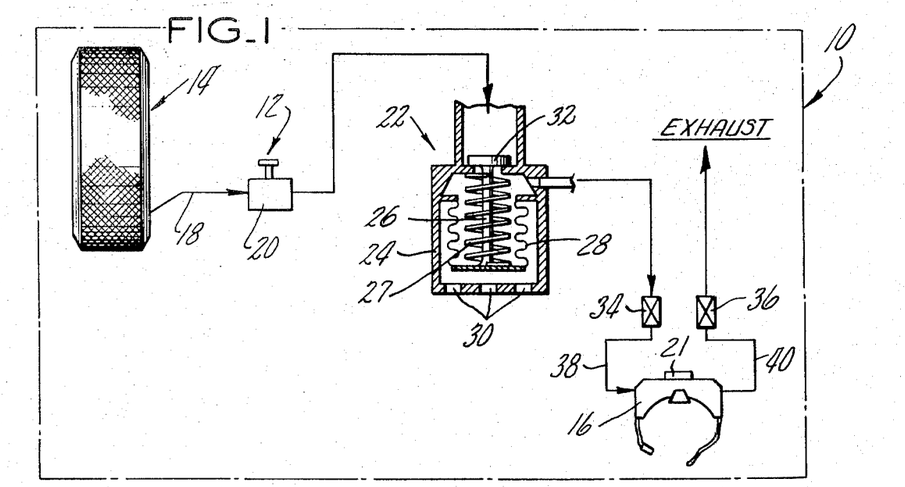
FIG. 1 is a schematic representation of the emergency air supply system for a submerged vehicle in which emergency air is provided to the breathing passages of the passenger with pressure regulation and flow control provisions.
Figure 2:
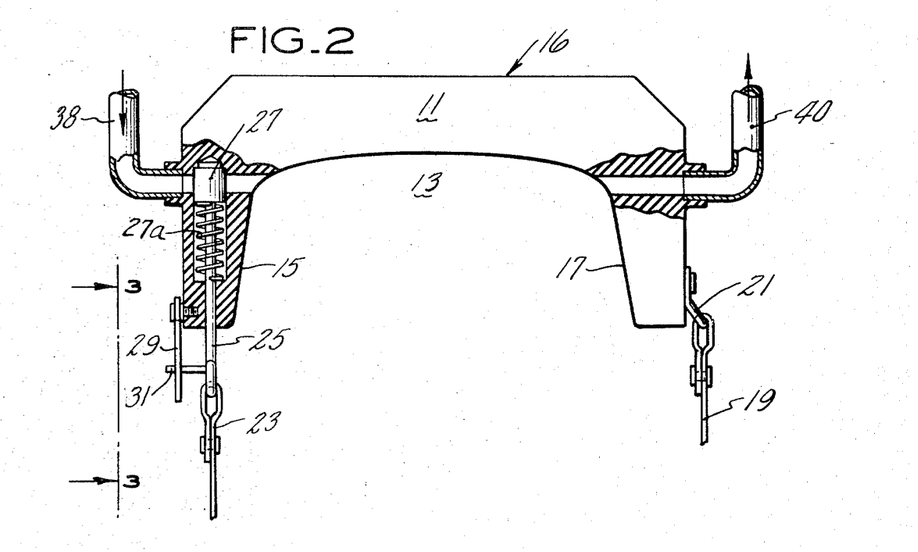
FIG. 2 is a showing of a transmitter or face mask, partially broken away, to illustrate air blockage and flow control means.
Figure 3:
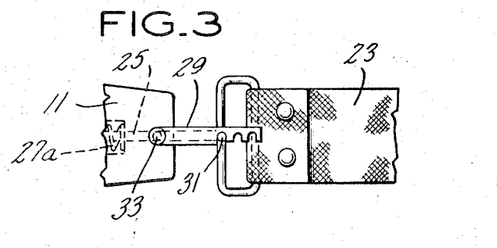
FIG. 3 is a showing taken along line 3—3 of FIG. 2.
Figure 4:
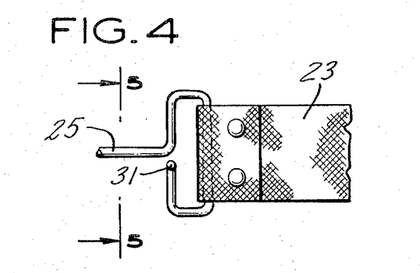
FIG. 4 is a showing taken along line 4—4 of FIG. 2.

Referring to FIG. 1 we see the schematic representation of land vehicle 10, which may be an automobile, and an emergency air supply system 12 adapted to be mounted therein and to provide the passenger of the vehicle with an emergency air supply should the vehicle become submerged in water or other hostile environments. Emergency air supply system 12 includes an air source 14 which may be the vehicle spare tire, or one or more of the vehicle operably mounted tires, an impact air cushion or a separate container. System 12 also includes an air transmitter mechanism 16, which is preferably of the face mask type with provisions for strapping to the passenger's head with the face mask enveloping the passenger's breathing passages.

Conventional connecting means 21, such as a clamp or magnet, is provided to attach transmitter 16 to a convenient place in the vehicle, such as the dashboard. Conduit means 18 connects the air source 14 to the air transmitter 16. On-off valve 20 is located in conduit 18 and may be of the conventional manually or automatically operated type so as to normally interrupt communication between the air source 14 and the transmitter mechanism 16 and which is actuatable to establish communication between the air source 14 and the transmitter mechanism 16 to permit the flow of pressurized air from the air source to the transmitter mechanism. Pressure regulator valve 22 is also located in conduit means 18 and includes housing 24 with reciprocating piston member 26 located therein and connected thereto through flexible bellows 28. Piston 26 is biased to a closed position by spring 27 and is subjected to the surrounding environmental pressure through apertures 30 in housing 24 and is actuatable thereby to overcome spring 27 to open valve 32 an amount proportional to the surrounding environmental pressure and hence regulate the pressure of the air passing from the air source 14 therethrough to the air transmitter unit 16 so that the passenger is provided air at a pressure slightly above the surrounding environmental pressure to permit ease of breathing. Line 38 represents the intake line of conduit 18 and line 40 represents the exhaust line thereof. The breathed air from exhaust line 40 may either be captured for reuse in a fashion to be described hereinafter, may be permitted to escape in vent fashion or, breathed air can merely be permitted to escape around the sides of the face mask portion of the transmitter member 16. Undirectional flow valves of conventional design, such as the flapper-type or the ball-check valve are utilized in the system, such as at 34 and 36, to insure that the flow from the air pressure source 14 to the transmitter member 16 is in that direction only and to insure that the flow from the transmitter unit is exhausted in the opposite direction only.

Air transmitter 16 is illustrated in FIGS. 2-5. Mask portion 11 defines cavity 13 in which the passenger's face is sealably engaged due to the gripping action of surfaces 15 and 17. Strap 19 extends around the passenger's head and engages mask portion 11 at fixed connection 21 and adjustable connection 23, which engages the rod 25 of piston 27, which is biased by spring 29 to extend across and block-off passage 38. It will therefore be seen that when system 12 is not in use, piston 27 prevents air leakage from source 14 through conduit 38 of transmitter 16.

Figure 5:
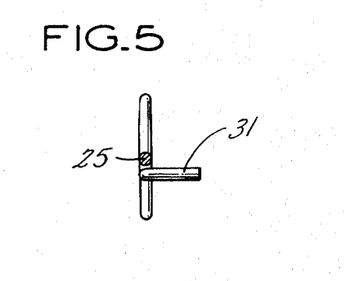
FIG. 5 is a showing taken along line 5—5 of FIG. 4.

When system 12 is to be used, the passenger automatically pulls piston 27 to its open position as he pulls strap 19 behind his head in placing transmitter 16 over his face. The passenger can manually select the position of piston 27, and hence the rate of breathing air flow through transmitter 16, by engaging the proper notch in lever 29 in engagement with projection 31 strap 19 (see FIG. 3). Lever 29 is pivotally connected at 33 to mask 11. For ease of operation, grip member 31 extends from piston rod 25 as shown in FIG. 5, for gripping by the passenger in positioning piston 27.

It will accordingly be seen that in FIG. 1 construction, pressurized air from air source 14 commences to flow to the passenger through transmitter member 16 after the on-off valve 20 is open. The pressure of the air being provided to the passenger is regulated by pressure regulating valve 22. While the FIG. 1 disclosed construction is preferred, it is possible that with skilled manipulation, and possibly on the basis of experience, a manually operated valve of the type commonly used on garden hoses could be used to perform the communication and establishing the pressure regulating function in conduit 18.

Figure 6:
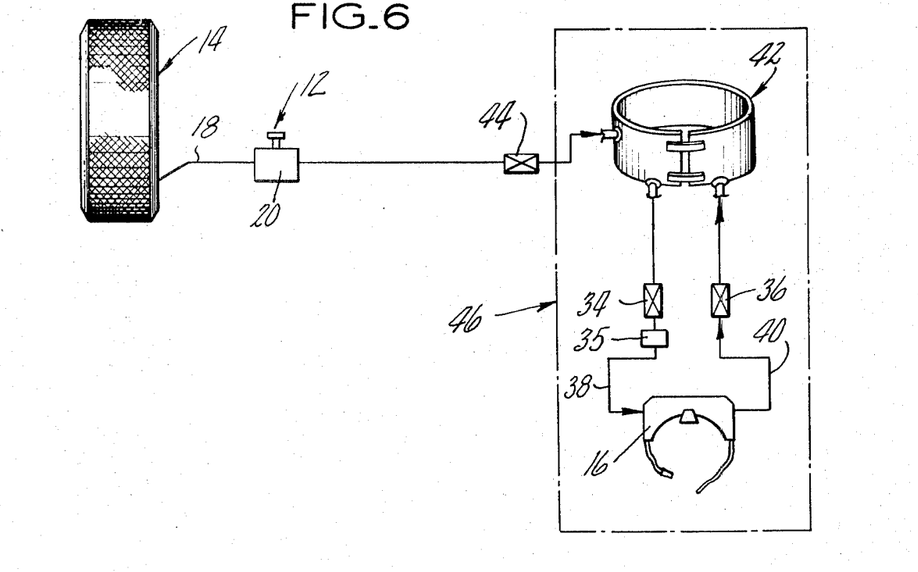
FIG. 6 is a schematic representation of a modification of our emergency air supply system in which air is provided to an air pack member for transmission to the passenger and with provisions for removing the air pack member and its support mechanism from the remainder of the system once it is inflated to permit the victim to leave the submerged vehicle with an emergency air supply.

Referring to FIG. 6 we see another embodiment of our emergency air supply system for submerged land vehicles which is similar in part to the FIG. 1 embodiment and will use similar reference numerals where applicable. In the FIG. 6 construction, pressurized air from air source 14 is again provided to air transmitter 16 through on-off valve 20, however, in this system an air pack or air trapper member 42 is provided and is located close to the passenger in convenient fashion in the vehicle. Air pack member 42 is preferably an inflatable and portable life jacket which is designed to envelope the upper portion or at least a part of the passenger's body when in use. In the FIG. 6 environment, pressurized air from air source 14 passes through conduit 18 and valve 20 and a conventional quick connect-disconnect mechanism 44 to air pack member 42 to inflate the air pack member, which, in turn, serves as a pressurized source of air which is connected through intake line 38 and exhaust line 40 to the transmitter mechanism 16. Quick connect-disconnect mechanism 44 is of conventional design and serves to permit the submerged vehicle passenger to disconnect the air pack member 42 and air transmitter mechanism 16, with the interconnecting portion of conduit member 18 therebetween, from the remainder of the system 12 so as to permit the passenger to leave the vehicle with the assistance of portable emergency air supply system 46 which is portable in nature and consists of air pack 42, transmitter 16, and the portion of conduit system 18 therebetween. In portable system 46, air pack member 42 is a life jacket which not only supplies the needed breathing air for the passenger but also assists the passenger in coming to the surface of the water and remaining on the surface of the water until rescued. Quick connect-disconnect mechanism 44 is the type having a flow shut-off valve device on each engaging part thereof which are operable when the parts are disconnected to prevent flow therefrom. In FIG. 6 the air pack member 42 can be sized to achieve a pressure which is compatible with breathing or a garden hose-type valve 35 could be used to perform a pressure regulating function as described in connection with FIG. 1

Figure 7:
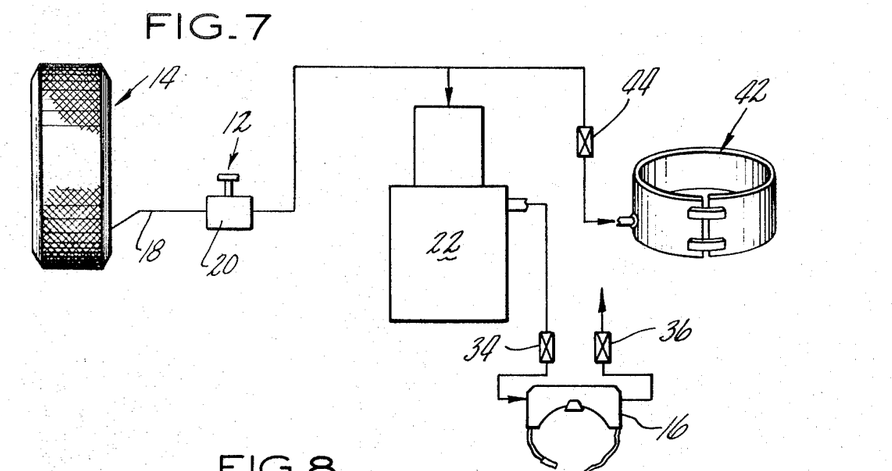
FIG. 7 is a modification of our emergency air supply system which both provides flow control and pressure regulated air to the passenger for breathing and provides an inflatable and detachable life jacket to be used in leaving the submerged vehicle.

In the FIG. 7 modification, many of the mechanisms used in the FIG. 1 preferred embodiment are utilized and similar reference numerals will be used in describing FIG. 7. In the FIG. 7 embodiment, the air from air source 14 flows through conduit system 18 and on-off valve 20 and then either through pressure regulator 22 to the passenger through air transmitter 16 or through unidirectional valve and quick connect-disconnect mechanism 44 to inflatable life jacket 42. The FIG. 7 embodiment operates as the previously described FIG. 1 embodiment except that the trapped passenger may disconnect the quick connect-disconnect mechanism 44 and utilize inflated life jacket 42 to leave the vehicle without emergency air supply. The FIG. 7 embodiment would be utilized in a situation where the entrapped passenger has determined that the submerged vehicle is located in shallow water and that he is capable of reaching the water surface without the aid of an emergency air supply.

It will be evident that in the FIG. 7 embodiment, the air source 14, with valve 20, could be used to inflate life jacket 42 only, if the passenger found that his vehicle is submerged in shallow water and he merely needed the assistance of the life jacket to get to and remain on the surface of the water.

Figure 8:
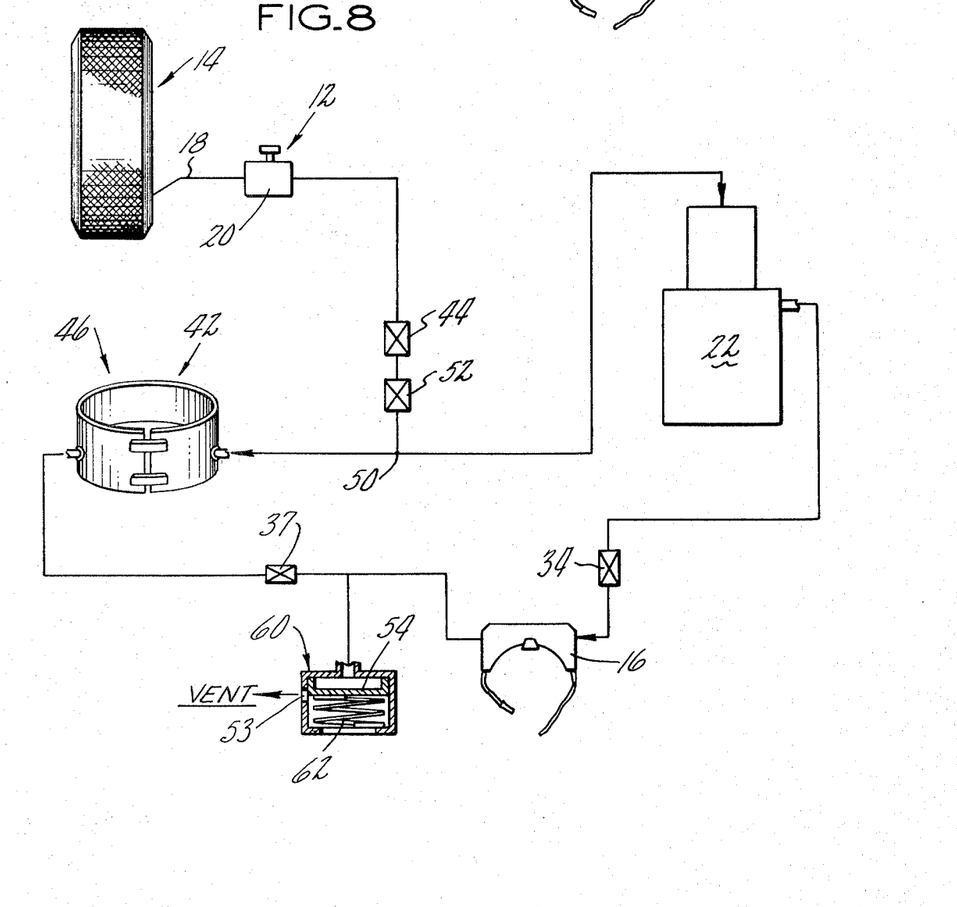
FIG. 8 is another modification of our emergency air supply system including provisions for both providing low controlled and pressure regulated emergency breathing air to the entrapped passenger and for inflating an air pack unit which is removable for the system and which can be used to provide pressure regulated air to the passenger as an emergency breathing supply separate from the overall system upon leaving the submerged vehicle.

FIG. 8 shows still another modification of our invention and the reference numerals used in FIG. 1 will again be repeated for similar mechanisms. In the FIG. 8 mechanism, air from air supply 14 flows through conduit mechanism 18 and on-off valve 20 through quick connect-disconnect mechanism 44 to joint 50 which permits simultaneous flow of pressurized air to transmitter member 16 through pressure regulator 22, and to air pack member 42. Unidirectional valve 52 prevents the flow of air from joint 50 back to the air source 14. Unidirectional valve 37 prevents the flow of air from air pack member 42 directly to the air transmitter 16. Accordingly, air pack 42, once inflated, is in isolation from the remainder of the system during normal operation so that the system therefore operates as in the FIG. 1 embodiment but with the air from transmitter 16 being exhausted through air vent mechanism 60. Air vent 60 allows the flow of air to be vented during normal operation when the pressure in air pack 42 is too high for the entrapped passenger to force the air back to air pack 42 with normal breathing reactions, but shuts off the flow leakage when the pressure in air pack 42 is low enough to allow normal breathing reactions to force air to air pack 42. Spring 62 holds piston 54 so that a pressure force is required to open piston 54 to allow flow to be vented through vent hole 53. This air vent mechanism 60 can be used in any embodiment if necessary. With the quick connect-disconnect mechanism 44 disconnected, the entrapped passenger has a portable emergency air supply system 46, which includes air pack 42, pressure regulator 22 and air transmitter 16 and exhaust vent 60, together with the appropriate portions of the interconnecting sections of conduit system 18 which can be utilized to leave the submerged vehicle in safety and proceed to the surface of the water. Air pack 42 is preferably in the form of a body enveloping life jacket.

Figure 9:
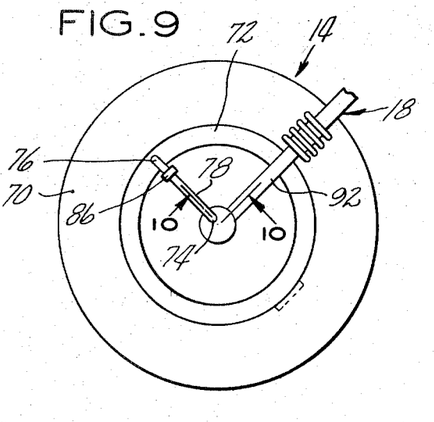
FIG. 9 is a showing of the connection of our emergency air supply system to a mounted tire on a vehicle.
Figure 10:
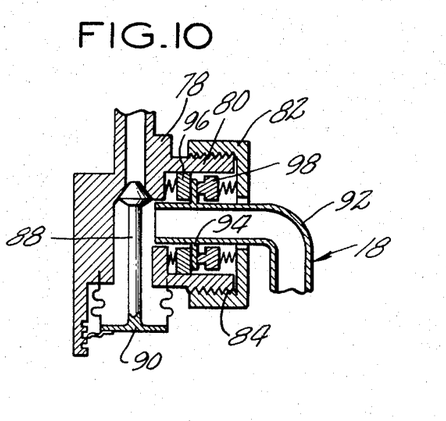
FIG. 10 is a sectional showing taken along line 10—10 of FIG. 9.

While the air source 14 is depicted in the earlier descriptions as being the vehicle spare tire, a larger supply of emergency air can be made available if one or more of the vehicle's operationally mounted tires are used either in conjunction with the spare tire or other air source, or alone. Mechanism to permit the use of an operationally mounted vehicle tire is shown in FIGS. 9 and 10. In this construction, air source 14 comprises inflated tire 70 which is operationally mounted on vehicle wheel 72 for rotation therewith about wheel axis 74. In this construction, valve stem 76 of tire 70 communicates with stem member 78, which is mounted for rotation with tire 70 on wheel 72 as best shown in FIG. 10. Stem member 78 includes cylindrical projection 80 which is mounted for rotation within vehicle mounted fixed cylinder 82, with bearing member 84 positioned therebetween. Unidirectional valve member 86 may be located in member 78 as shown in FIG. 9 and on-off valve member 88, which is shown in its off position in FIG. 10 but which is actuatable in any convenient fashion, such as by solenoid or by the application of pressure within bellows system 90 to an open position so as to establish communication between tire 70 and conduit 18 through fixed conduit member 92, which is joined to conduit system 18 and which includes flange member 94 received between carbon seal rings 96 and 98 within sylinders 80 and 82 to prevent air leakage therearound. If pressure is to be used to open valve 88, that pressure may well be the pressure from the spare tire which is actuated by the on-off valve 20 of FIG. 1 to pass through conduit 92 and into bellowed chamber 90 to bring operationally mounted tire 70 into communication with conduit 18.

Figure 11:
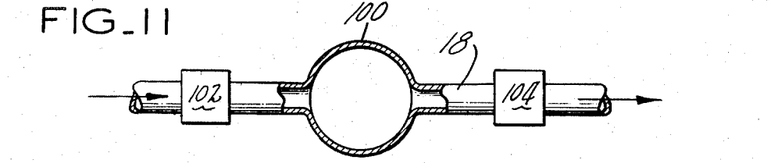
FIGS. 11—13 are showings of pumps which can be used with our system.

As previously stated, it may be necessary to use a pump mechanism in conduit 18 either to get air from the air source 14 to the transmitter 16 or from transmitter 16 to locations elsewhere in the system and recommended types of pumps are shown in FIGS. 7–10. The FIG. 11 construction is a hand or foot operated flexible ball member 100 located in conduit 18 between unidirectional valves 102 and 104 and may be operated by the passenger to contract under hand or foot pressure to displace the air therein through valve 104 and conduit 18 in pumping fashion and to return due to its own resiliency to its normal position upon release to draw more air thereinto from conduit 18 through valve 102 for pumping therefrom upon the next depression stroke.

Figure 12:
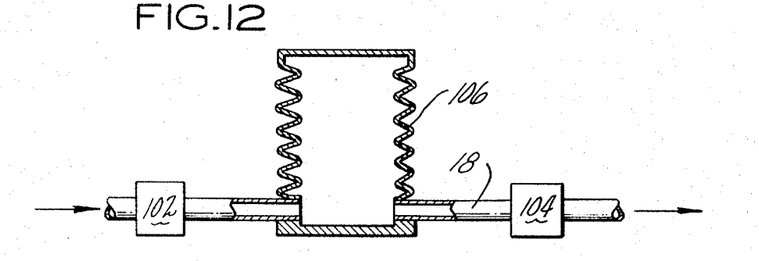

The FIG. 12 construction is a hand or foot operated bellows mechanism 106 which operates in similar fashion and pumps the air therefrom through conduit 18 and valve 104 when depressed and draws air thereinto through unidirectional valve 102 when released for pumping therefrom in the next depression stroke.

Figure 13:
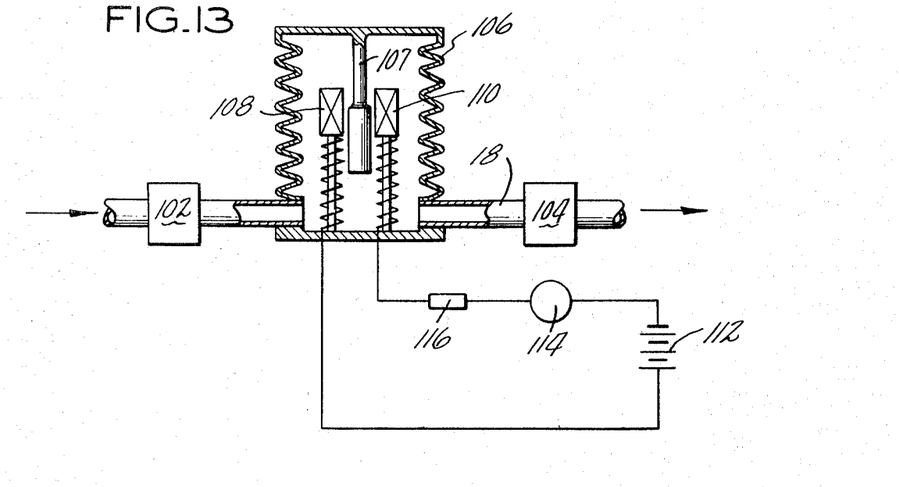

The FIG. 13 construction is an automatic pump. In the FIG. 13 construction, a bellows type pump similar to the FIG. 12 construction is shown in conduit 18 between unidirectional valves 102 and 104. Direct current solenoid mechanisms 108 and 110 are located within the interior of bellows mechanism 106 adjacent actuating arm 107, which connects to bellows 106. Solenoid 107–110 is actuated by power from the vehicle battery or a separate sealed battery system 112 in response to heat responsive switch 114, which detects the temperature change brought on by the vehicle's submerged condition, and which causes the actuation of the solenoid 107–110 to perform an automatic pumping of bellows type pump 106 when the emergency air system switch 116 of the vehicle 10 is actuated.

Our experiments with this emergency air supply system revealed that it is preferable to have the air supply as close to the passenger as possible for ease of breathing and that the chest encircling air pack 42 provides maximum breathing comfort.

We wish it to be understood that we do not desire to be limited to the exact details of construction shown and described, for obvious modifications will occur to a person skilled in the art.

We claim:

1. Air transmitting means comprising a face mask for enveloping a person's breathing passages and sealing therearound, a passageway extending through one side of said mask, an opening in said face mask intersecting said passage, a member in said opening movable between a position closing said passageway and a position opening said passageway with positions in between presenting a varying opening, spring means biasing said member to its closed position, a member extending from said member to the exterior of said face mask for operably moving said first member, the free end of said second member having one end of a headstrap connected thereto, the other end of said headstrap being connected to the other side of said face mask.

2. An emergency air supply system for passengers in a submerged land vehicle including:
   A. a pressurized source of air,
   B. transmitter means adapted to envelop the breathing passages of the passenger,
   C. conduit means connecting said pressurized air source to said transmitter means,
   D. valve means operatively associated with said conduit means to establish communication therethrough between said pressurized air source and said transmitter means,
   E. pressure regulating means operatively associated with said conduit means to regulate the pressure of the air being transmitted therethrough from said pressurized air source to said transmitter means, and
   F. wherein said pressurized air source is at least one of the inflated tires operatively mounted on the vehicle wheel and including a pressure transfer member including means mounted for rotation with the tire on the wheel and stationary means connected to the vehicle and constituting part of said conduit means, and means to establish pressure communication between the rotatable portion of the transfer means and the stationary portion thereof.

3. An emergency air supply system for passengers in a submerged land vehicle including:
   A. a pressurized source of air,
   B. transmitter means adapted to envelop the breathing passages of the passenger,
   C. conduit means connecting said pressurized air source to said transmitter means,
   D. valve means operatively associated with said conduit means to establish communication therethrough between said pressurized air source and said transmitter means,
   E. pressure regulating means operatively associated with said conduit means to regulate the pressure of the air being transmitted therethrough from said pressurized air source to said transmitter means,
   F. wherein said conduit means includes a first conduit connected to transmit air from said pressurized air source to said transmitter means and a second conduit connected to transmit breathed air from said transmitter means,
   G. and including pump means operatively associated with at least one of said conduits to assist in transmitting air therethrough and wherein said pump means includes solenoid means and temperature responsive signal means operatively connected to the solenoid means to cause solenoid actuation and hence pump actuation in response to a selected temperature signal means.

4. An emergency air supply system for passengers in a submerged vehicle having a passenger compartment with a dashboard and supported on air inflated tires including:
   A. a pressurized vehicle tire,
   B. transmitter means adapted to envelope the breathing passages of the passenger,
   C. quick attach-detach means to store said transmitter means in the passenger compartment,
   D. conduit means connecting said tire to said transmitter means,
   E. valve means operatively associated with said conduit means to establish communication therethrough between said tire and said transmitter means,
   F. pressure regulating means operatively associated with said conduit means to regulate the pressure of the air being transmitted therethrough from said tire to said transmitter means,
   G. an inflatable portable member located in the passenger compartment and attached to said conduit means and wherein said conduit means is connected to provide pressurized air to both said inflatable member and said transmitter means, and
   H. quick attach-detach means operatively associated with said conduit means and actuatable to disconnect said portable inflatable member, said transmitter means and the portion of the conduit means therebetween from the remainder of the system.

5. An emergency air supply system for a passenger in a submerged vehicle having a passenger compartment including:
   A. a transmitter means adapted to envelop the breathing passages of a passenger,
   B. means to store said transmitter means in the passenger compartment,
   C. a separate inflatable portable member accessible from the passenger compartment,
   D. first conduit means connecting said transmitter means to said inflatable portable member,
   E. an inflated vehicle tire providing a pressurized source of air,
   F. a second conduit means connecting said source to said first conduit means for simultaneous flow of pressurized air to the transmitter means and separate inflatable portable member,
   G. pressure regulating means operatively associated with said first conduit means to regulate the pressure of the air being transmitted through said second conduit from said source to said transmitter means,
   H. valve means operatively connected with said second conduit to establish communication therethrough between said source and said second conduit means, and
   I. quick attach-detach means operatively associated with said second conduit means and actuatable to disconnect said inflatable portable member, said transmitter means and interconnecting conduit means therebetween from the remainder of the system.

6. An emergency air supply system for a passenger in a submerged vehicle having a passenger compartment including:
   A. a transmitter means adapted to envelop the breathing passages of a passenger, B. means to store said transmitter means in the passenger compartment, C. a separate inflatable portable member accessible from the passenger compartment, D. first conduit means connecting said transmitter means to said inflatable portable member, E. a pressurized source of air, F. a second conduit means connecting said source to said first conduit means for simultaneous flow of pressurized air to the transmitter means and separate inflatable portable member, G. pressure regulating means operatively associated with said first conduit means to regulate the pressure of the air being transmitted through said second conduit from said source to said transmitter means, H. valve means operatively connected with said second conduit to establish communication therethrough between said source and said second conduit means, and I. quick attach-detach means operatively associated with said second conduit means and actuatable to disconnect said inflatable portable member, said transmitter means and interconnecting conduit means therebetween from the remainder of the system, J. said pressure regulating means is responsive to the pressure of the surrounding environment, K. unidirectional means located in said conduit means between said pressure regulating means and said air transmitter to permit air flow from said pressure regulating means to said transmitter means solely, L. unidirectional valve means located in said conduit means between said transmitter means and said inflatable, portable member to permit air flow from said transmitter means to said member solely, and M. a discharge valve located in said conduit means between said member and said transmitter means and closer to said transmitter means than said unidirectional valve to bleed air from said conduit means when the pressure therein exceeds a predetermined limit.

7. An emergency air supply system for a passenger in a submerged vehicle having a passenger compartment including:

A. a transmitter means adapted to envelop the breathing passages of a passenger, B. means to store said transmitter means in the passenger compartment, C. a separate inflatable portable member accessible from the passenger compartment, D. first conduit means connecting said transmitter means to said inflatable portable member, E. a pressurized source of air, F. a second conduit means connecting said source to said first conduit means for simultaneous flow of pressurized air to the transmitter means and separate inflatable portable member, G. pressure regulating means operatively associated with said first conduit means to regulate the pressure of the air being transmitted through said second conduit from said source to said transmitter means, H. valve means operatively connected with said second conduit to establish communication therethrough between said source and said second conduit means, and I. quick attach-detach means operatively associated with said second conduit means and actuatable to disconnect said inflatable portable member, said transmitter means and interconnecting conduit means therebetween from the remainder of the system, J. said transmitting means comprising a face mask for enveloping a person's breathing passages and sealing therearound, a passageway extending through one side of said mask, an opening in said face mask intersecting said passage, a member in said opening movable between a position closing said passageway and a position opening said passageway with positions in between presenting a varying opening, spring means biasing said member to its closed position, a member extending from said member to the exterior of said face mask for operably moving said first member, the free end of said second member having one end of a headstrap connected thereto, the other end of said headstrap being connected to the other side of said face mask.

8. An emergency air supply system for a passenger in a submerged vehicle having a passenger compartment including:

A. a transmitter means adapted to envelop the breathing passages of a passenger, B. means to store said transmitter means in the passenger compartment, C. a separate inflatable portable member accessible from the passenger compartment, D. first conduit means connecting said transmitter means to said inflatable portable member, E. a pressurized source of air, F. a second conduit means connecting said source to said first conduit means for simultaneous flow of pressurized air to the transmitter means and separate inflatable portable member, G. pressure regulating means operatively associated with said first conduit means to regulate the pressure of the air being transmitted through said second conduit from said source to said transmitter means, H. valve means operatively connected with said second conduit to establish communication therethrough between said source and said second conduit means, I. quick attach-detach means operatively associated with said second conduit means and actuatable to disconnect said inflatable portable member, said transmitter means and interconnecting conduit means therebetween from the remainder of the system, and J. pump means operatively associated with at least one of said conduits to assist in transmitting air therethrough.

9. Apparatus according to claim 8 wherein said pressurized source of air is at least one of the vehicle inflated tires.

10. Apparatus according to claim 8 wherein said pump means is of the manually operated volume displacement type.

11. An emergency air supply system for passengers in a submerged land vehicle including:

A. a pressurized source of air,
B. transmitter means adapted to envelop the breathing passages of the passenger,
C. conduit means connecting said pressurized air source to said transmitter means,
D. first valve means operatively associated with said conduit means to establish communication therethrough between said pressurized air source and said transmitter means,
E. pressure regulating means operatively associated with said conduit means to regulate the pressure of the air being transmitted therethrough from said pressurized air source to said transmitter means,
F. an inflatable and portable air pack member operatively associated with said conduit means to receive pressurized air from said pressurized source of air and be inflated thereby and to transmit the air so receive to said transmitter means,
G. second valve means operatively associated with said conduit means and connected to receive pressurized air from said pressurized source of air and to transmit the air so received therethrough to both said pressure regulating means and said air pack member and including:
  1. means to quickly disconnect said second valve means, said pressure regulating means, said transmitter means, and said air pack member with the portion of the conduit means extending therebetween from the remainder of the system,
  2. means responsive to the actuation of said quick connect-disconnect means to establish communication through said conduit means between said air pack member and said pressure regulating means and transmitter means,
H. said pressure regulating means is responsive to the pressure of the surrounding environment,
I. unidirectional means located in said conduit means between said pressure regulating means and said air transmitter to permit air flow from said pressure regulating means to said transmitter means solely,
J. unidirectional valve means located in said conduit means between said transmitter means and said air pack member to permit air flow from said transmitter means to said air pack member solely, and
K. a discharge valve located in said conduit means between said air pack member and said transmitter means and closer to said transmitter means than said unidirectional valve to bleed air from said conduit means when the pressure therein exceeds a predetermined limit.

* * * * *